June 16, 1931.  A. Y. DODGE  1,810,101
BRAKE MECHANISM
Original Filed July 16, 1925  2 Sheets-Sheet 2

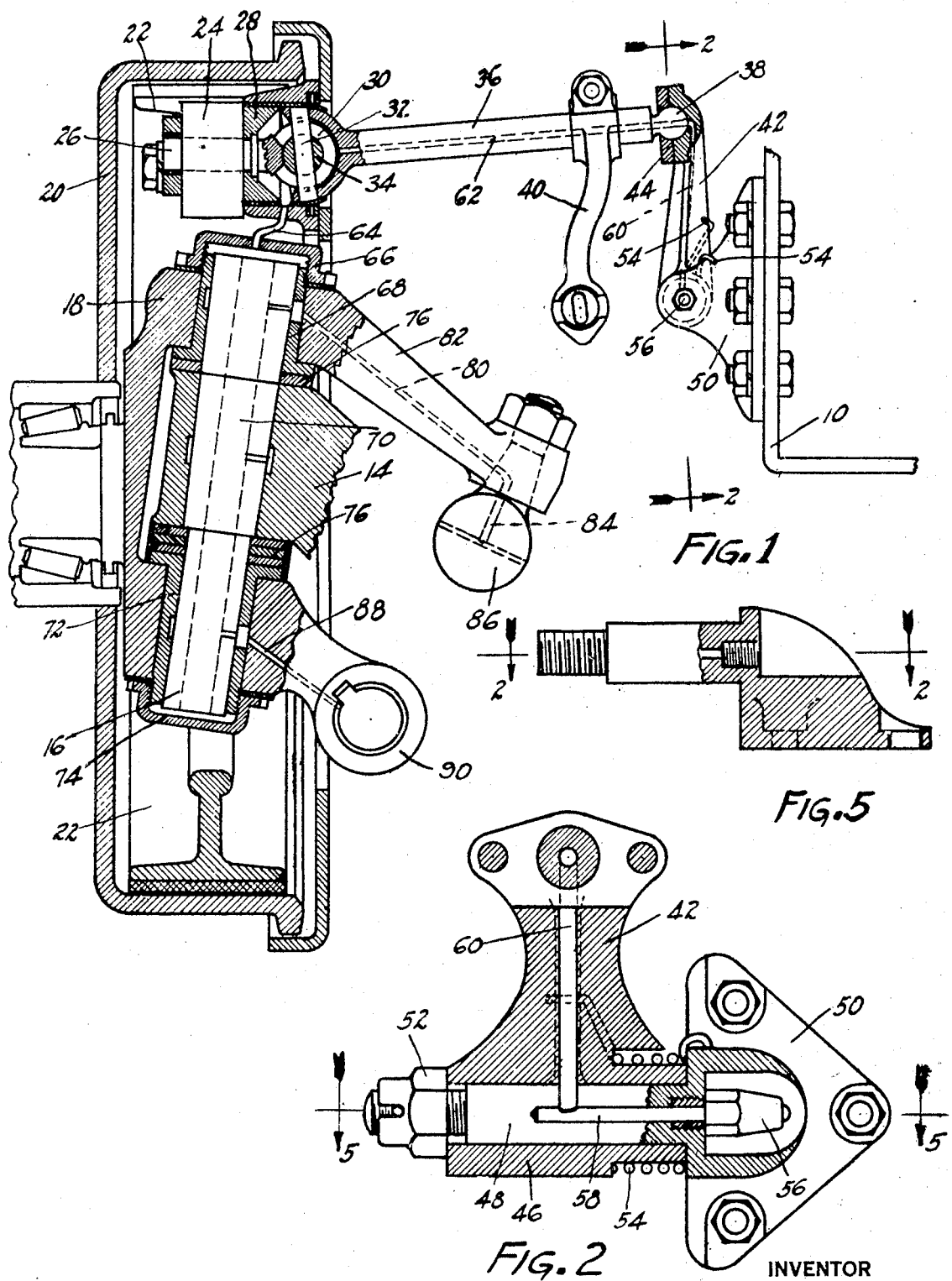

INVENTOR
ADIEL Y. DODGE
BY
ATTORNEY

Patented June 16, 1931

1,810,101

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE MECHANISM

Continuation in part of application Serial No. 43,953, filed July 16, 1925. This application filed August 5, 1925. Serial No. 48,387.

This invention relates to brakes, and is illustrated as embodied in an automobile front wheel brake and novel control mechanism therefor. An object of the invention is to provide simple and easily lubricated operating means supported by the chassis, preferably avoiding all sliding joints by the use of an arm or lever pivoted on the chassis and universally jointed to the inner end of the brake-operating shaft. The lever is shown in the illustrated embodiment as formed with a sleeve embracing an overhanging shaft portion integral with or carried by a supporting bracket. If desired, and as illustrated, a torsion spring may engage the lever to urge it outwardly toward the brake, and to be compressed at the same time between the sleeve and bracket, thus obviating any possibility of the parts rattling.

An important feature of the invention relates to lubricating the universal joint between the lever and shaft, and preferably also the pivot joint of the shaft,—and if desired even including the universal joint above the king-pin and the king-pin itself,—by lubricant supplied to a conduit formed in the above-described swinging lever.

The above and other objects and features of the invention, including various novel combinations of parts and desirable particular constructions, will be apparent from the following description of two illustrative embodiments shown in the accompanying drawings, in which:

Fig. 1 is a transverse vertical section through one front brake and associated parts;

Fig. 2 is a section on the line 2—2 of Fig. 1 through the swinging lever;

Fig. 5 is a section through the bracket on the line 5—5 of Figure 2.

Figure 3:
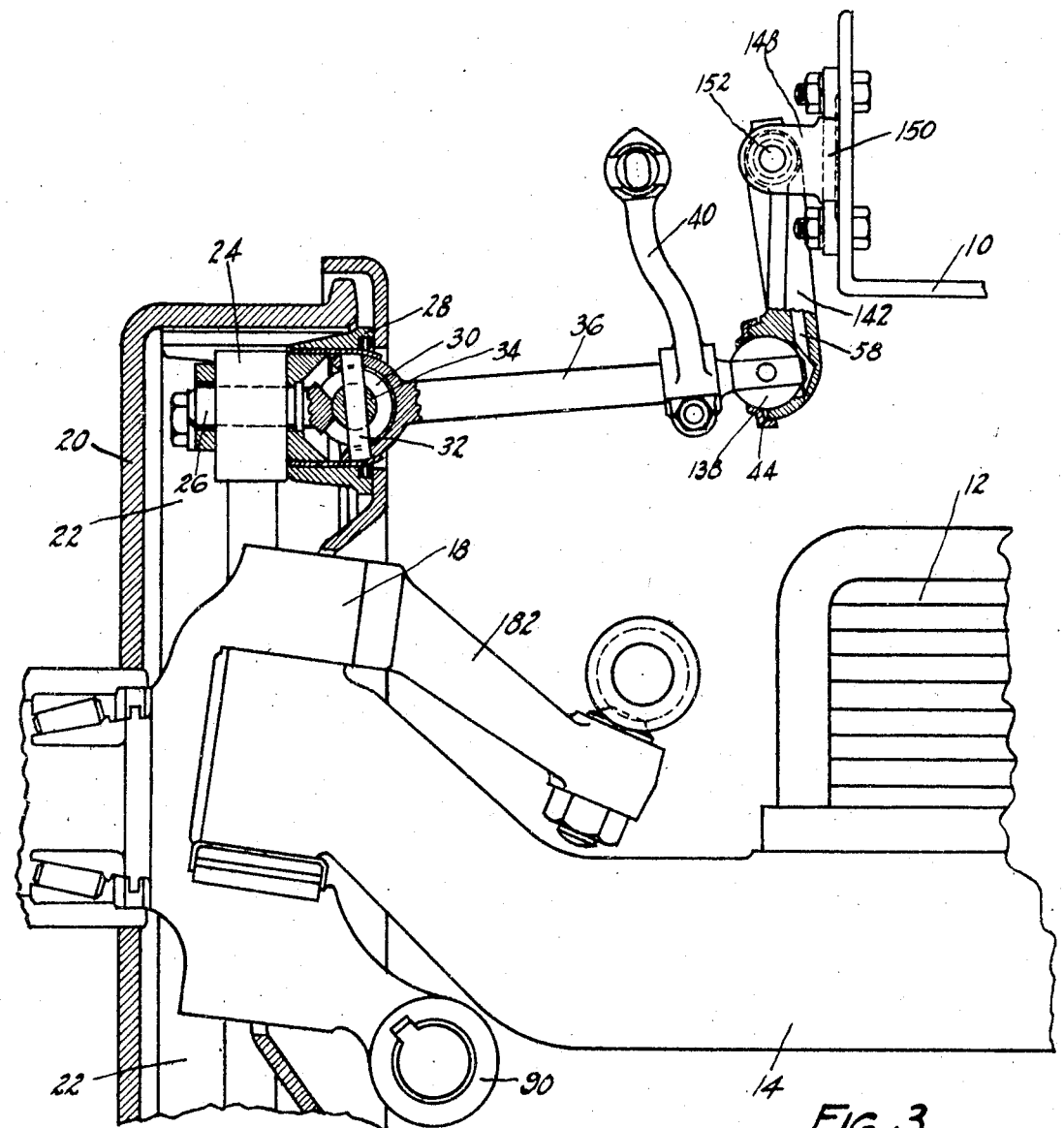
Fig. 3 is a view corresponding to Fig. 1, but showing a modification.
Figure 4:
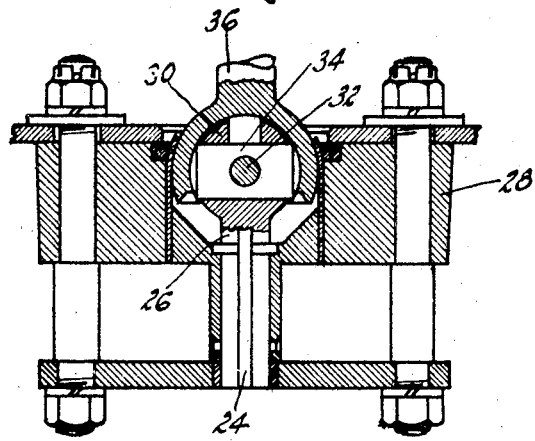
Fig. 4 is a horizontal section through the cam and the universal joint above the king-pin.

In the illustrated embodiments, the vehicle includes a chassis frame 10 supported by the usual springs 12 on a front axle 14 and on a rear axle (not shown). At each end of the front axle is swivelled by a king-pin 16 a spindle and knuckle 18, rotatably supporting one of the front wheels carrying the brake drum 20. Within the drum are arranged shoes 22 expanded by a double cam or the like 24. Except as further described below, the above-listed parts or their equivalents may be of any desired construction.

Cam 24 is secured on a short shaft 26 journalled in a support 28, and forked to provide two outwardly-spherical arms 30 having inner parallel plane surfaces to allow a swinging movement to a cross pin 32 carried by a cylindrical connector 34 having its ends received in openings in arms 30. Pin 32 is carried by a semi-spherical shell formed on the end of the brake shaft 36, the whole forming a novel and almost dirt-proof universal joint above and substantially in line with the king-pin.

Preferably the vertical axis of this universal joint,—i. e. the axis of pin 32,—is inclined at an angle with respect to the axis of king-pin 16, so that the outer brake is automatically relieved on a turn.

On the inner end of shaft 36 is a ball portion 38, not larger in diameter than the shaft itself, so that an operating arm 40 may be slipped over it and clamped on the shaft. Portion 38 fits into a semi-spherical socket in the upper end of an arm or lever 42, being held there by a pair of half-caps 44 secured to the lever in any desired manner, to form a universal joint.

At its lower end (Fig. 2) lever 42 is formed as a sleeve 46 journalled on a cylindrical shaft portion 48 overhanging the end of, and integral with, a bracket 50 bolted or otherwise fastened to frame 10. The sleeve is held by a nut 52 serving to compress an anti-rattle spring 54, which is hooked under tension at one end back of lever 42 and at its other end behind a part of bracket 50. Spring 54 urges the lever constantly outwardly toward the brake, this outward tension, taking with the compression due to nut 52, serving to obviate all tendency toward rattle.

Lubricant is supplied either from a central system, or from a fitting 56, to a conduit 58 in portion 48 of the bracket, this conduit opening into the interior of the sleeve 46 on the bottom of lever 42, to lubricate the pivot joint, and being normally in line with a conduit 60 in lever 42, which conduit 60 opens into the semi-spherical socket at the top of the lever to lubricate the universal joint with the shaft.

The lubricant may, if desired, pass thence through a passage 62 drilled in the shaft, emptying into, and lubricating, the universal joint above the king-pin. Here it also collects into a groove in support 28, and drains through a conduit 64 through a cap 66 screwed on a bushing 68 receiving the upper end of the king-pin. The king-pin itself is hollow, having a passage 70 to the bottom of the axle, where it is closed by a bushing 72 having a cap 74. Thrust washers 76, or other anti-friction bearings, may be interposed between axle and knuckle. Also a further conduit may empty inside the hub of the wheel, to lubricate the wheel bearings, preferably through a passage in the spindle of knuckle 18, thus lubricating all the parts from the one source 56. The hollow king-pin 16 has the usual radial passages to the surfaces to be lubricated.

I prefer to cause one of the upper radial passages from the hollow king-pin to open into a passage 80 in a steering arm 82, which in turn communicates with passages 84 in the ball member 86 of a ball-and-socket joint with the drag link (not shown) of the steering mechanism. Similarly one of the lower passages may communicate with a passage 88 in a lower arm 90 which carries the parts connected by the usual ball-and-socket joint (not shown) to the cross tie rod (not shown) which connects the two front wheels.

The arrangement of Fig. 3 differs from that described above, in that lever 142 extends downwardly instead of upwardly, and has the sleeve at its top received between aligned bosses 148 on the bracket 150, with a pivot bolt 152 passing through the sleeve and through the aligned bosses.

While two illustrative embodiments have been described in detail, it is not my intention to limit the scope of the invention to those particular embodiments, or otherwise than by the terms of the appended claims. The term "chassis frame" in the claims is intended as a convenient generic designation including any part of the chassis which is supported by the springs. The present invention is in part a continuation of my prior application No. 43,953, filed July 16, 1925.

I claim:

1. A vehicle having a spring-supported chassis frame and a brake on an unsprung part, and comprising, in combination with said parts, a brake-operating substantially horizontal shaft terminating adjacent the frame in a ball end, a lever pivoted on the frame and having a socket receiving the ball end to form a universal joint, the lever having a lubricant conduit emptying into the socket, and means carried by the bracket for introducing lubricant into the conduit.

2. A vehicle having a spring-supported chassis frame and a brake on an unsprung part, and comprising, in combination therewith, a brake-applying shaft, a bracket on the frame having an overhanging projecting shaft portion, and a lever universally jointed at one end to the end of the shaft and having a sleeve at its other end embracing the shaft portion of the bracket.

3. A vehicle having a spring-supported chassis frame and a brake on an unsprung part, and comprising, in combination therewith, a brake-applying shaft, a bracket on the frame having an overhanging projecting shaft portion, a lever universally jointed at one end to the end of the shaft and having a sleeve at its other end embracing the shaft portion of the bracket, and means for supplying lubricant from the bracket to the two joints at opposite ends of the lever.

4. A vehicle having a spring-supported chassis frame and a brake on an unsprung part, and comprising, in combination therewith, a brake-applying shaft, a bracket on the frame having an overhanging projecting shaft portion, a lever universally jointed at one end to the end of the shaft and having a sleeve at its other end embracing the shaft portion of the bracket, and a torsion spring compressed between the bracket and sleeve and engaging the bracket and lever at opposite ends to urge the lever toward the brake.

5. A vehicle having a spring-supported chassis frame and a brake on an unsprung part, and comprising, in combination therewith, a brake-applying shaft, a bracket on the frame having an overhanging projecting shaft portion, a lever universally jointed at one end to the end of the shaft and having a sleeve at its other end embracing the shaft portion of the bracket, and a spring engaging the bracket and lever to urge the lever toward the brake.

6. A vehicle having a spring-supported chassis frame and a brake on an unsprung part, and comprising, in combination therewith, a brake-applying shaft, a lever universally jointed to the inner end of the shaft and pivotally supported on the frame, and a spring urging the lever outwardly toward the brake.

7. A vehicle having a spring-supported chassis frame and a brake on an unsprung part, and comprising, in combination therewith, a brake-applying shaft, a bracket on the frame, a lever universally jointed to the inner end of the shaft and pivotally connected to the bracket, and an anti-rattle spring acting on the bracket and lever to prevent rattle in the pivot connection and also urging the lever toward the brake to prevent rattle in the universal joint.

In testimony whereof I have hereunto signed my name.

ADIEL Y. DODGE.